US007133883B2

(12) United States Patent
Talagala et al.

(10) Patent No.: US 7,133,883 B2
(45) Date of Patent: Nov. 7, 2006

(54) GENERAL TECHNIQUES FOR DIAGNOSING DATA CORRUPTIONS

(75) Inventors: Nisha D. Talagala, Fremont, CA (US); Brian Wong, Gordonsville, VA (US)

(73) Assignee: Sun Microsystems, Inc., Santa Clara, CA (US)

( * ) Notice: Subject to any disclaimer, the term of this patent is extended or adjusted under 35 U.S.C. 154(b) by 682 days.

(21) Appl. No.: 10/329,077

(22) Filed: Dec. 23, 2002

(65) Prior Publication Data
US 2004/0133539 A1 Jul. 8, 2004

(51) Int. Cl.
*G06F 17/30* (2006.01)
*G06F 12/00* (2006.01)

(52) U.S. Cl. .................... 707/202; 707/204; 714/15; 714/20

(58) Field of Classification Search ............... 707/1–4, 707/9, 100, 103 R, 102, 104.1, 200, 203, 707/104, 204; 709/102, 223, 224–226, 220, 709/230, 245; 714/15, 20, 21
See application file for complete search history.

(56) References Cited

U.S. PATENT DOCUMENTS

| | | | | |
|---|---|---|---|---|
| 4,479,196 A | * | 10/1984 | Ferrer et al. ................ | 707/100 |
| 5,197,148 A | | 3/1993 | Blount et al. | |
| 5,201,044 A | | 4/1993 | Frey et al. | |
| 5,206,939 A | | 4/1993 | Yanai et al. | |
| 5,692,184 A | * | 11/1997 | Ardoin et al. ........... | 707/103 R |
| 5,720,026 A | | 2/1998 | Uemura et al. | |
| 5,796,934 A | | 8/1998 | Bhanot et al. | |
| 5,819,275 A | * | 10/1998 | Badger et al. .............. | 707/100 |
| 5,835,085 A | * | 11/1998 | Eick et al. .................. | 715/853 |
| 5,889,934 A | | 3/1999 | Peterson | |
| 5,909,688 A | * | 6/1999 | Yoshioka et al. ........... | 707/200 |
| 5,933,831 A | * | 8/1999 | Jorgensen .................... | 707/100 |
| 5,995,308 A | | 11/1999 | Assouad et al. | |
| 6,009,542 A | | 12/1999 | Koller et al. | |
| 6,343,343 B1 | | 1/2002 | Menon et al. | |
| 6,347,359 B1 | | 2/2002 | Smith et al. | |
| 6,397,309 B1 | | 5/2002 | Kedem et al. | |
| 6,408,416 B1 | | 6/2002 | Morley et al. | |
| 6,418,519 B1 | | 7/2002 | Cadden et al. | |
| 6,438,591 B1 | * | 8/2002 | Fehskens et al. ........... | 709/223 |
| 6,467,060 B1 | | 10/2002 | Malakapalli et al. | |

(Continued)

OTHER PUBLICATIONS

EMC, "The EMC CIARiiON Data Integrity Difference", May 2001, pp. 1-11.

*Primary Examiner*—Jeffrey Gaffin
*Assistant Examiner*—Jacques Veillard
(74) *Attorney, Agent, or Firm*—Dorsey & Whitney LLP

(57) ABSTRACT

Diagnosis of corruption in interrelated data entities uses a graph of nodes and edges. Datum nodes represent the data entities, relationship nodes represent the relationships among the data entities. The datum nodes are connected through their relationship nodes by the edges. When corruption is detected, the relationships are analyzed and each edge connecting a datum node to a relationship node is removed from the graph when the corresponding relationship is invalid. The datum nodes that remain connected to their relationship nodes form a subgraph and the corresponding data entities are considered correct. In one aspect, if more than one subgraph is formed, the datum nodes in the largest are used. In another aspect, the data entities and relationships are analyzed to create the graph when the data entities are assumed correct. The data entities may be data and metadata of various types that can be associated with the data.

39 Claims, 11 Drawing Sheets

U.S. PATENT DOCUMENTS

| | | |
|---|---|---|
| 6,476,814 B1 * | 11/2002 | Garvey ................... 345/440 |
| 6,484,185 B1 | 11/2002 | Jain et al. |
| 6,553,511 B1 | 4/2003 | DeKoning et al. |
| 6,584,544 B1 | 6/2003 | Morley et al. |
| 6,587,962 B1 | 7/2003 | Hepner et al. |
| 6,606,629 B1 | 8/2003 | DeKoning et al. |
| 6,629,273 B1 | 9/2003 | Patterson |
| 6,684,289 B1 | 1/2004 | Gonzalez et al. |
| 6,687,791 B1 | 2/2004 | Morrison |
| 6,728,922 B1 | 4/2004 | Sundaram et al. |
| 6,874,001 B1 | 3/2005 | Narang et al. |
| 6,880,060 B1 | 4/2005 | Talagala et al. |
| 2003/0070042 A1 | 4/2003 | Byrd |
| 2003/0140299 A1 | 7/2003 | Duncan et al. |
| 2003/0145270 A1 | 7/2003 | Holt et al. |
| 2003/0163777 A1 | 8/2003 | Holt |
| 2003/0188216 A1 | 10/2003 | Elko et al. |
| 2003/0221155 A1 | 11/2003 | Weibel et al. |
| 2004/0123032 A1 | 6/2004 | Talagala et al. |
| 2004/0153746 A1 | 8/2004 | Talagala et al. |

* cited by examiner

GENERAL TECHNIQUES FOR DIAGNOSING DATA CORRUPTIONS

FIELD OF THE INVENTION

This invention relates generally to data integrity, and more particularly to diagnosing data corruptions.

BACKGROUND OF THE INVENTION

Data corruption is a major problem in large-scale data storage systems and in data transmission systems. In the short term, the corrupted data cause applications to return erroneous results and may result in the failure of the applications. Over the long term, the corrupted data may be replicated through multiple systems. In many instances, if the corruption is detected and the cause determined, the correct data may be recoverable.

Data corruptions may be detected in various ways. For example, one approach has been to associate integrity metadata, such as data checksums, embedded logical block addresses, etc., with the data on writes and to verify the data using the integrity data on reads. However, while integrity metadata can be used to detect data corruption, it cannot by itself determine the cause of the corruption. For example, if a piece of data does not match its corresponding integrity metadata, either the data or the integrity metadata may be corrupt and, without additional information, it is not possible to determine which item is faulty.

Similarly, data redundancy may be used to detect data corruption, but the same problem arises. When the original data and the redundant data do not match, without additional information, it is not possible to determine which of the two copies is correct.

SUMMARY

Diagnosis of corruption in interrelated data entities uses a graph of nodes and edges. Datum nodes represent the data entities, relationship nodes represent the relationships among the data entities. The datum nodes are connected through their relationship nodes by the edges. When corruption is detected, the relationships are analyzed and each edge connecting a datum node to a relationship node is removed from the graph when the corresponding relationship is invalid. The datum nodes that remain connected to their relationship nodes form a subgraph and the corresponding data entities are considered correct. In one aspect, if more than one subgraph is formed, the datum nodes in the largest are used. In another aspect, the data entities and relationships are analyzed to create the graph when the data entities are assumed correct. The data entities may be data and metadata of various types that can be associated with the data.

The present invention is described in conjunction with systems, methods, and machine-readable media of varying scope. In addition to the aspects of the present invention described in this summary, further aspects of the invention will become apparent by reference to the drawings and by reading the detailed description that follows.

DETAILED DESCRIPTION OF THE INVENTION

In the following detailed description of embodiments of the invention, reference is made to the accompanying drawings in which like references indicate similar elements, and in which is shown by way of illustration specific embodiments in which the invention may be practiced. These embodiments are described in sufficient detail to enable those skilled in the art to practice the invention, and it is to be understood that other embodiments may be utilized and that logical, mechanical, electrical, functional and other changes may be made without departing from the scope of the present invention. The following detailed description is, therefore, not to be taken in a limiting sense, and the scope of the present invention is defined only by the appended claims.

An arrangement of data entities, such as found in storage or transmission environments, and certain relationships among the data entities are abstracted into graphs. The relationships may be data-to-data, data-to-metadata, or metadata-to-metadata, and share the property that if the relationship is valid, it can be assumed the participating data entities are correct. The data and metadata are represented by data/metadata ("datum") nodes and the relationships by relationship nodes in the graph. Instead of being directly connected by edges in the graph, the datum nodes are connected through the corresponding relationship node.

The metadata may be commonly used integrity metadata, such as error correction codes (ECC), circular redundancy codes (CRC), checksums, or the like, but the invention is not limited to use with only integrity metadata. Additionally, such integrity metadata is not limited to a single piece of data but may be comprised of multiple parts, such as a checksum, an embedded logical block address, and a generation number. Each part of the integrity metadata would be represented in the graph by its own datum node with an edge to the corresponding data-metadata relationship node.

The graph is subsequently used to diagnose the cause of data corruption in the arrangement when corruption is detected. Various mechanisms may be used to detect data corruption, such as those disclosed in pending U.S. patent application Ser. No. 10/222,074 titled "Efficient Mechanisms for Detecting Phantom Write Errors" filed on Aug. 15, 2002 and assigned to the assignee of the present invention.

Figure 1A:
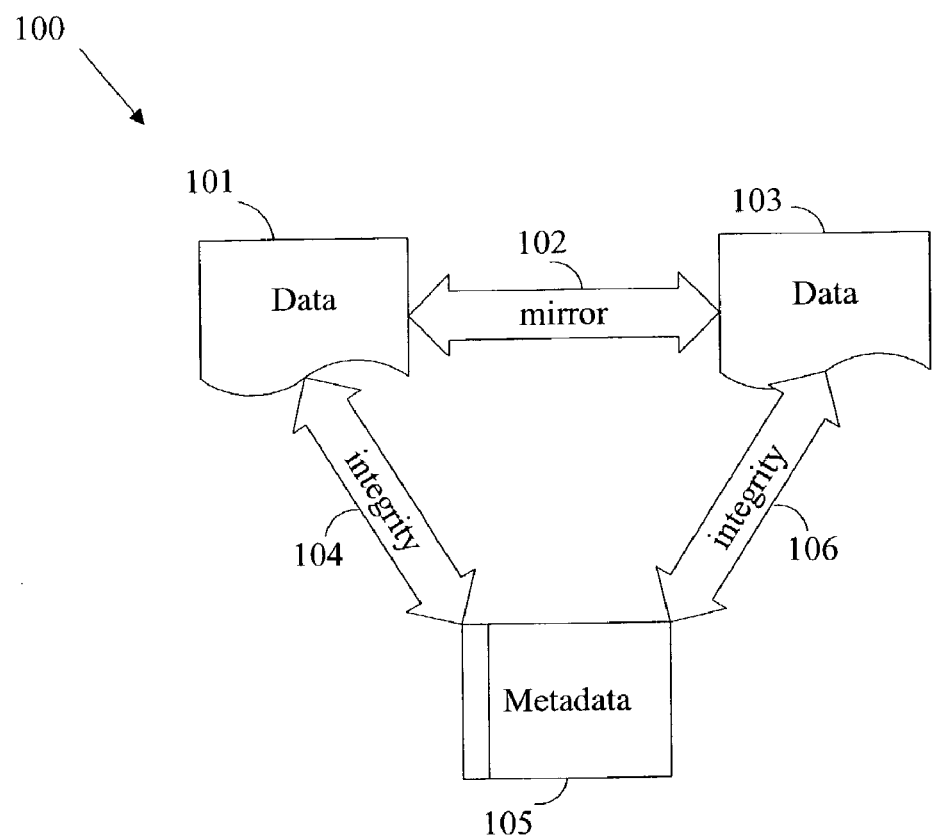
FIGS. 1A–C are diagrams illustrating various data arrangements and corresponding graphs according to one embodiment of the invention.
Figure 1A:
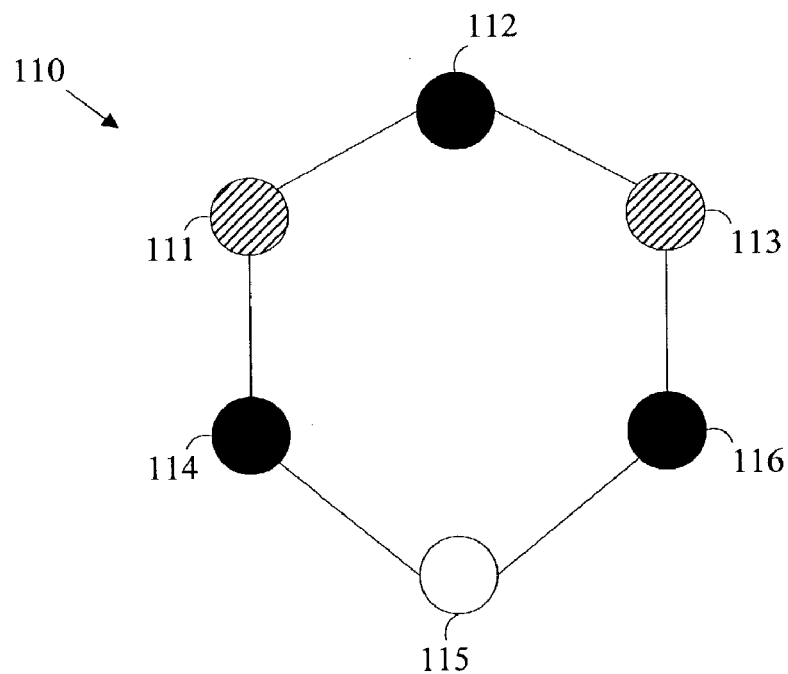
Figure 1B:
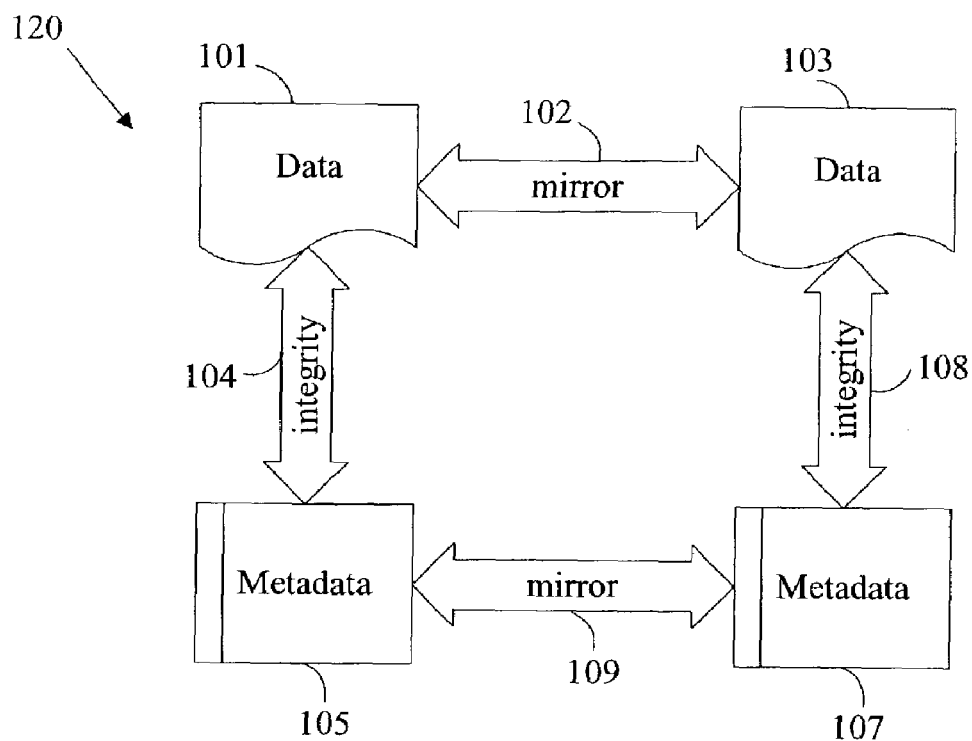
Figure 1B:
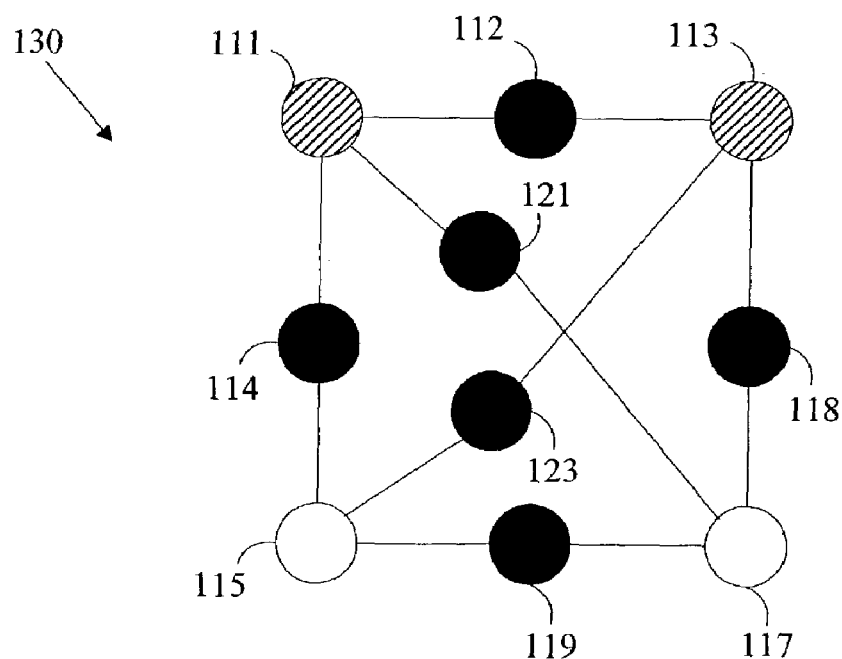
Figure 1C:
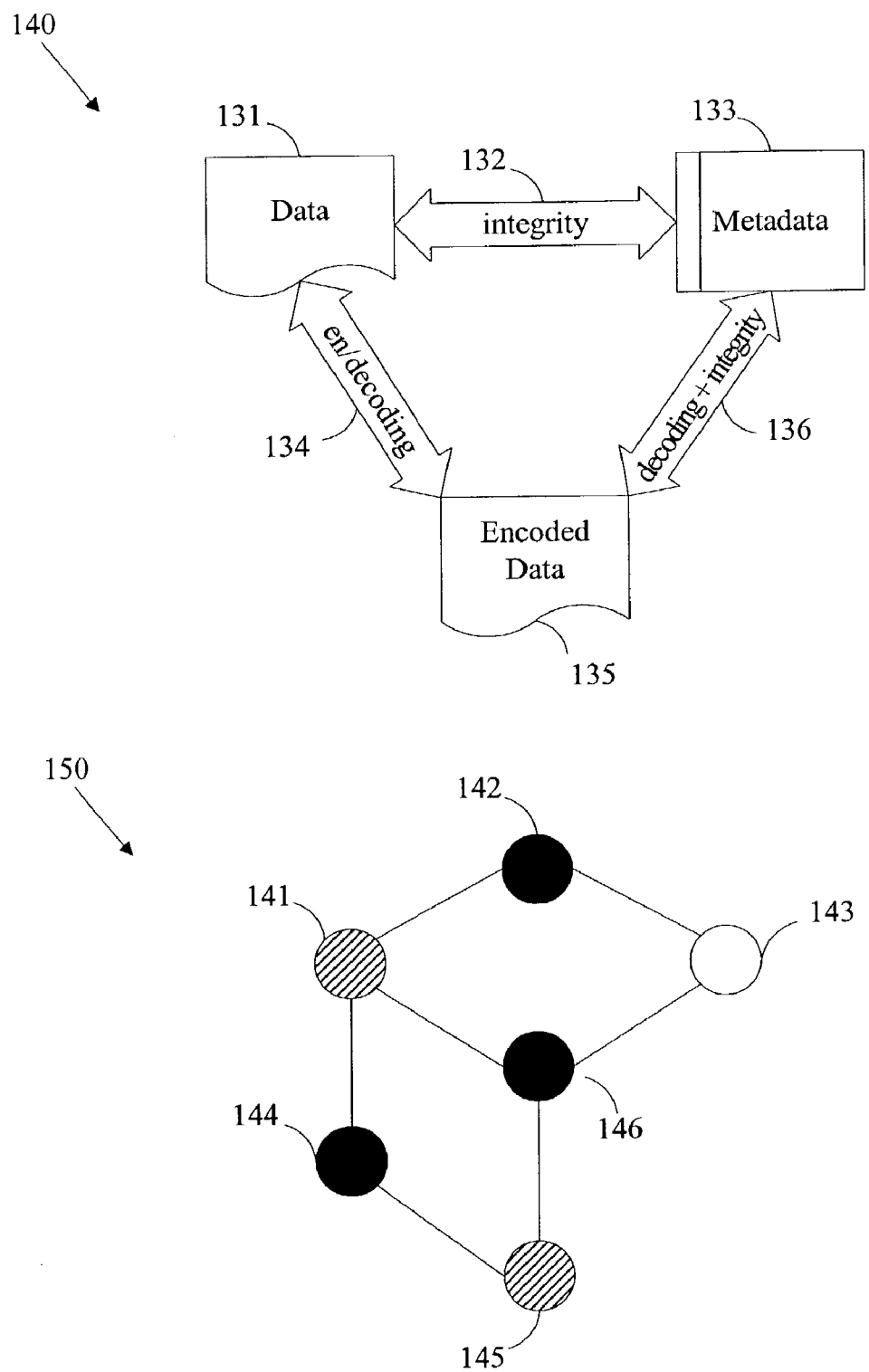
Figure 2A:
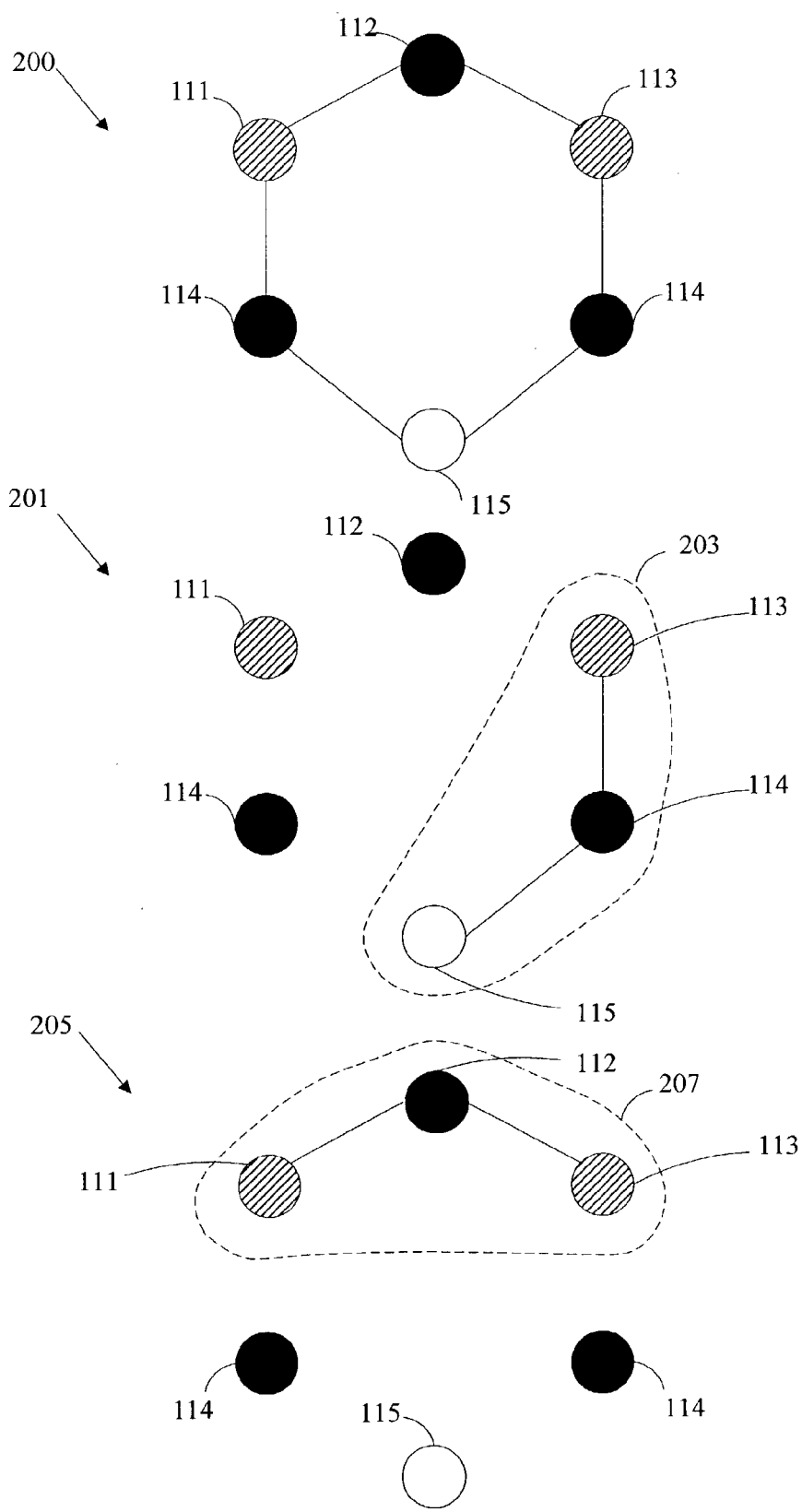
FIGS. 2A–C are subgraphs resulting from the operation of one embodiment of the invention on the graphs of FIGS. 1A–C.
Figure 2B:
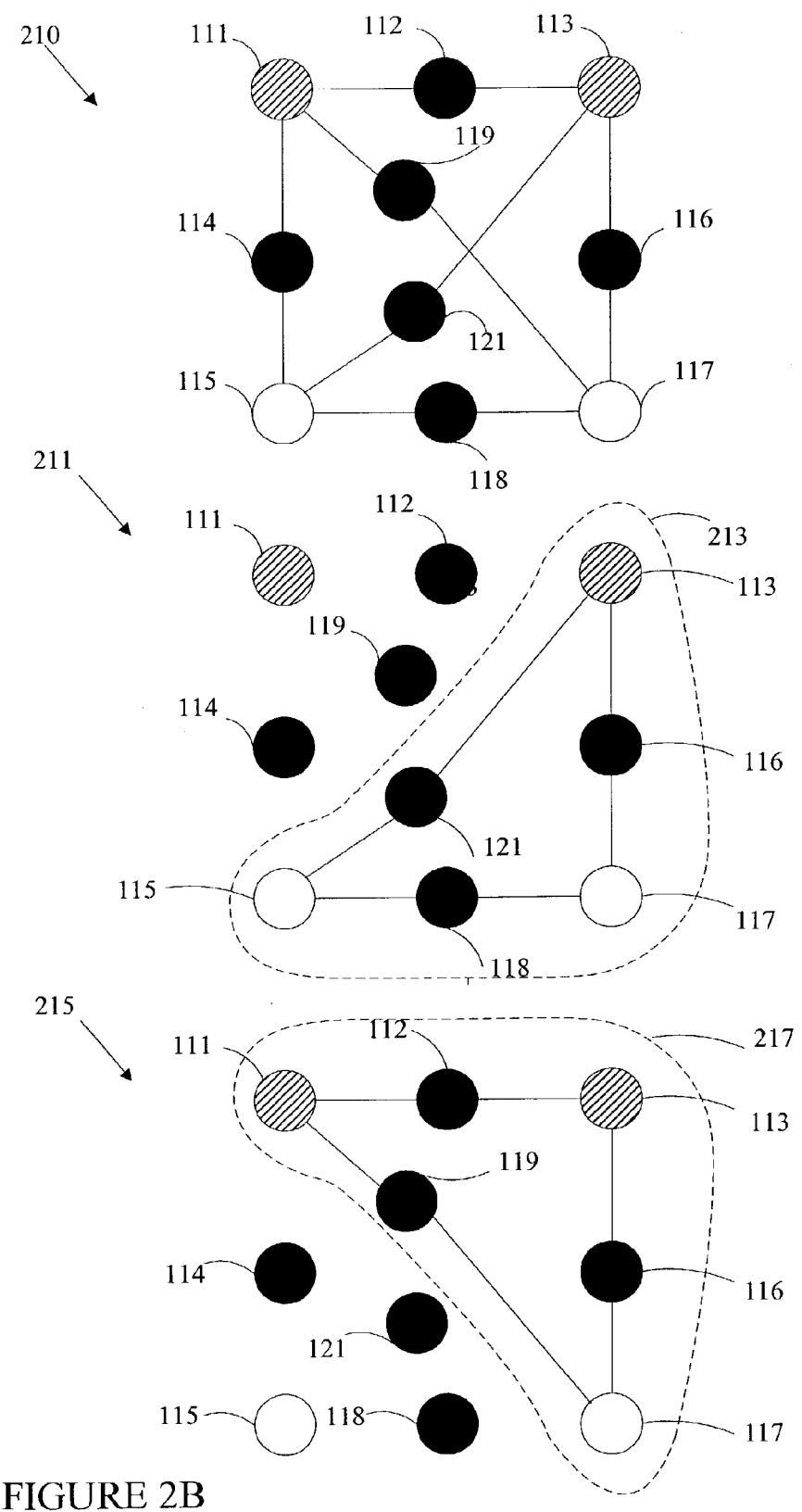
Figure 2C:
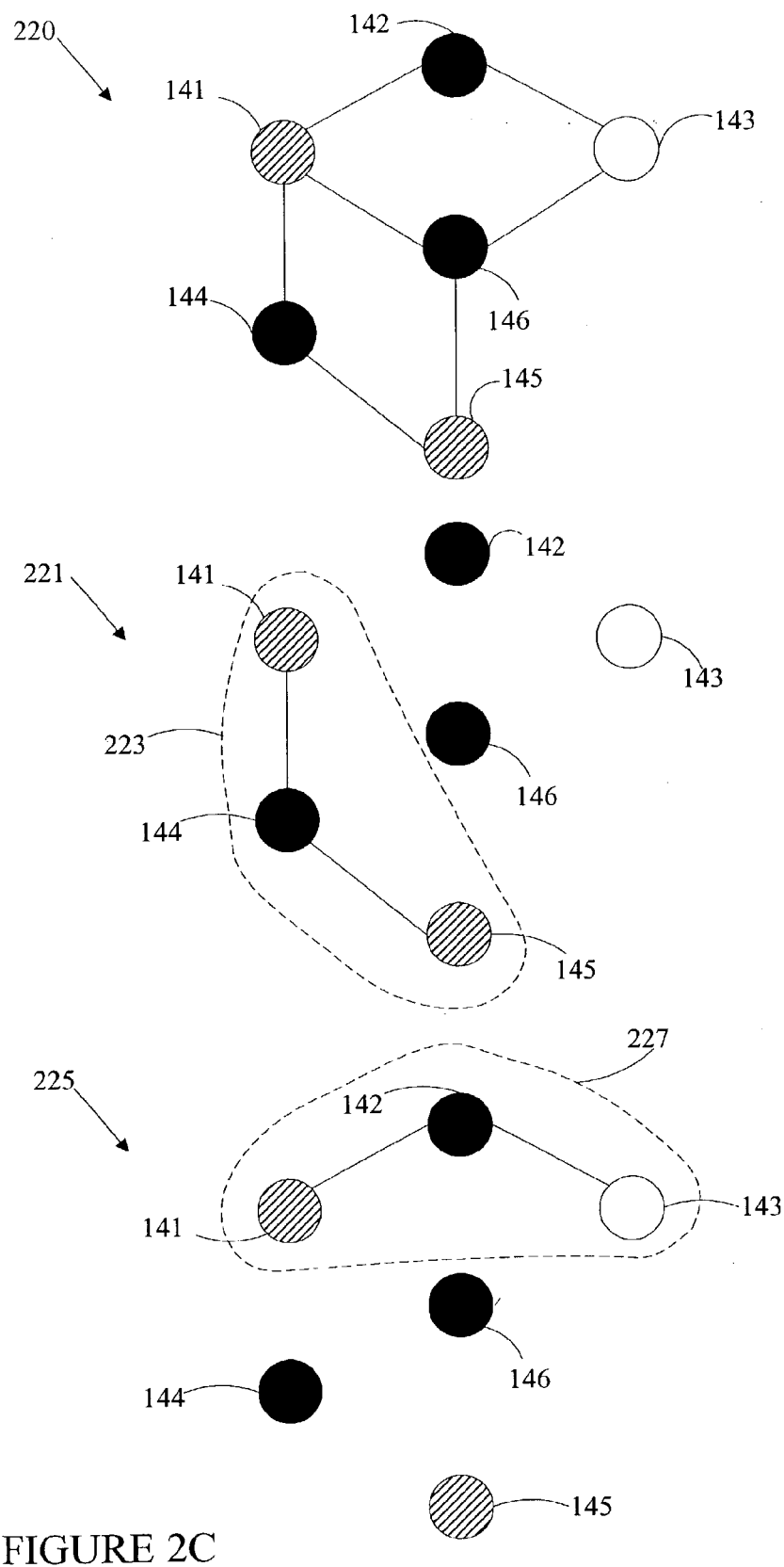

FIGS. 1A through 1C illustrate exemplary arrangements of data entities and their corresponding graphs when there is no corruption in the data entities. Relationships among the data entities are illustrated as double headed arrows but the format of an arrow is not intended to imply any particular type of relationship, e.g. a relationship may be uni-directional such as a checksum, or bi-directional such as an encoding/decoding algorithm. FIGS. 2A through 2C illustrate how the graphs of FIGS. 1A–C may be used to diagnose data corruption in the data entities. To assist in understanding the graphs, data nodes are represented by hatched circles, metadata nodes by unfilled circles, and relationship nodes by solid circles.

A simple arrangement 100 of data entities that incorporates data redundancy and integrity, such as would be found in an array of mirrored disks that also store parity or error correction information for the data, is shown in FIG. 1A. Data 101 and data 103 are identical copies of each other with their mirror relationship illustrated by arrow 102. Metadata 105 is integrity metadata corresponding to both data 101 and data 103, as illustrated by arrows 104, 106. The arrangement 100 may be graphed as shown in graph 110. Data 101, 103 are represented by datum nodes 111, 113. Metadata 105 is represented by metadata node 115. The relationships between the nodes are illustrated by relationship nodes 112, 114, 116. Relationship node 112 represents the mirror relationship 102 between data 101 and may be expressed as D1=D2, where D1 is data node 101 and D2 is data node 103. Relationship nodes 114, 166 represent the integrity relationships among data 101, 103 and metadata 105, may be expressed as M1=cksm(D1) and M1=cksm(D2), where M1 is metadata 105 and the integrity relationships 104, 106 are identical checksum functions (cksm).

A more complex arrangement 120 is illustrated in FIG. 1B. As in FIG. 1A, data 101 and 103 are mirrored 102. Each data 101, 103 has its own corresponding integrity metadata, metadata 105 and metadata 107, respectively. Assuming the same integrity mechanisms (illustrated as arrows 104, 106) are used to create the metadata 105 and 107, the metadata 105 and metadata 107 are mirror copies of each other (illustrated by arrow 109). Although not illustrated for clarity, because the datum nodes and the metadata nodes are mirror images, additional integrity relationships can be implied between data 101 and metadata 107, and between data 103 and metadata 105. Arrangement 120 is typical of mirrored data storage arrays that stored multiple copies of their integrity data.

The corresponding graph 130 represents data 101, 103 as datum nodes 111, 113, and metadata 105, 107 as metadata nodes 115, 117. Relationship nodes 112, 114, 116 and 118 correspond to the mirroring and integrity relationships among the data entities in the arrangement 120. The implied relationships in arrangement 120 between data 101 and metadata 107, and between data 103 and metadata 105 are represented in graph 130 by relationship nodes 121, 123, respectively.

The arrangements 100 and 120 of FIGS. 1A and 1B illustrate relationships that occur between pairs of data entities. The invention is not so limited, as shown in FIG. 1C, which illustrates an arrangement 140 in which three entities participate in one relationship. Data 131 and metadata 133 are related through an integrity mechanism 132. Data 131 is also related to encoded data 135 through an encoding/decoding algorithm 134. Thus, data 135 is also related to the metadata 133 through decoding and integrity mechanism 136. Such an arrangement of data may be found in networks in which integrity metadata is transmitted along with an encrypted version of the corresponding data so that the encrypted data can be verified upon receipt. The corresponding graph 150 contains relationship nodes 142, 144 that represent the paired relationships 132, 134, and a relationship node 146 that represents the three-way relationship 136 in arrangement 140 between the datum nodes 141, 145 and 143.

The invention is particularly applicable in environments in which the data participates in very complex relationships, such as found in RAID (redundant array of independent disks) storage subsystems in which the data is written in "stripes" over several physical disks to form a larger logical disk and to maximize throughput in the subsystem. Various levels of RAID also include parity data that enables recovery of the data when a drive fails by calculating the exclusive OR (XOR) of the remaining data and the parity data.

Turning now to FIGS. 2A through 2C, the use of the graphs created in FIGS. 1A through 1C to diagnose data corruption in any of the data entities is described. When data corruption is detected in a data arrangement, a working copy of the corresponding graph from FIGS. 1A–C is created, the relationships among the data entities in data arrangement are analyzed, and the edges between datum nodes and relationship nodes in the working graph are removed for relationships found to be invalid. The resulting subgraphs are analyzed to determine which most likely contains the datum nodes corresponding to the uncorrupt data entities. In one embodiment, the most likely set of uncorrupt data entities correspond to the datum nodes in the largest subgraph.

When data 101 in FIG. 1A is corrupted, the analysis of the relationships in the data arrangement 100 creates graph 201 from working graph 200 as shown in FIG. 2A. In this case, the metadata 105 and the data 103 still have a valid integrity relationship so the edges between the representative datum nodes 115, 113 and the relationship node 114 remain intact, while the edges between the representative datum nodes 111, 113, 115 and the relationship nodes 112, 114 are removed since the mirror and integrity relationships 102 and 104 are no longer valid. As a result, subgraph 203 indicates that data entity 103 corresponding to datum node 113 is uncorrupted. On the other hand, graph 205 illustrates an instance in which the integrity metadata 105 as represented by metadata node 115 is corrupted. In this case, the subgraph 207 indicates that both data entities 103, 105 are uncorrupted.

Starting with working graph 210, analysis of the relationships in data arrangement 120 of FIG. 1B results in graph 211 if data 101 is corrupted and graph 215 if metadata 105 is corrupted. As before, subgraphs 213, 217 contain the datum nodes corresponding to the data entities that are valid.

Similarly, as shown in FIG. 2C, when the corruption occurs in the metadata 133 or the data 135 in the data arrangement 140 of FIG. 1C, analysis of the relationships produces the graphs 221, 225, respectively, from the starting graph 220 (corresponding to graph 150 in FIG. 1C).

As described in conjunction with FIGS. 1A–C and 2A–C, data corruption may be diagnosed through graphs containing datum nodes that represent the potentially corrupted data entities and that are connected through relationship nodes that represent relationships among the data entities. While the invention is not limited to application in any particular arrangement of data entities, for sake of clarity three exemplary data arrangements have been described. Connecting the datum nodes through the relationship nodes enables diagnosis graphs to be created for highly complex data storage arrangements, such as RAID 5 in which inter-related data, parity data, and metadata are distributed across an array of disks. Furthermore, the relationship nodes allow the diagnosis of data corruption in arrangements in which more than two entities participate in a relationship. Additional types of data arrangements in which the invention may employed include networks, memory and disk caches, and data states within computer systems.

Next, the particular methods performed by a processor to diagnose data corruption are described with reference to flowcharts in FIGS. 3 and 4, in which executable instructions are represented by blocks 301 until 321, and blocks 401 until 409, respectively. Describing the methods by reference to a flowchart enables one skilled in the art to develop such instructions to carry out the methods within a suitably configured processor. The executable instructions may be written in a computer programming language or may be embodied in firmware logic or in hardware circuitry. Furthermore, it is common in the art to speak of executable instructions as taking an action or causing a result. Such expressions are merely a shorthand way of saying that execution of the instructions by a processor causes the processor perform an action or a produce a result. The methods may be executed by a controller of a data storage system or by a processing unit of a computer as illustrated in FIGS. 5A–C, and described further below. It will be appreciated that more or fewer processes may be incorporated into the methods described herein without departing from the scope of the invention, and that no particular order is implied by the arrangement of blocks shown and described.

Figure 3:
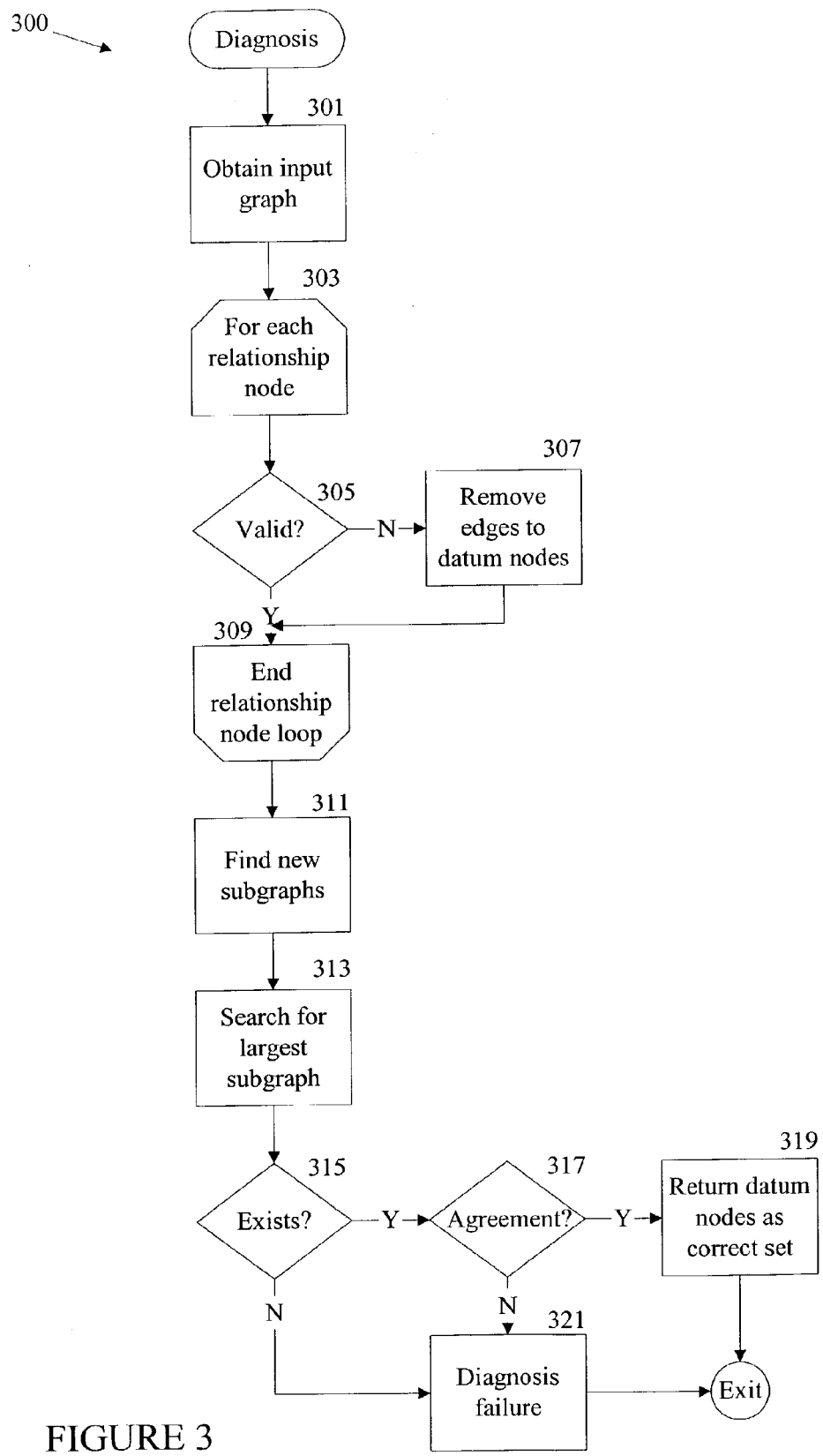
FIG. 3 is a flowchart of a method for performing the operations on the graphs of FIGS. 2A–C.

FIG. 3 illustrates a method of diagnosing data corruption in a data arrangement using the graphs and relationship nodes described above. The diagnosis method 300 is typically invoked when data corruption is detected in a data arrangement. The method 300 obtains an input graph created for the data arrangement when all the data entities are known, or assumed, to be valid (block 301). For each relationship node in the graph (block 303), the method 300 evaluates the appropriate data entities to determine if they still maintain the relationship represented by the relationship node, i.e., the relationship is still valid (block 305). If the relationship is not valid, the method 300 removes the edges to the datum nodes that are related by the relationship node (block 307). Once the relationship nodes have been evaluated (block 309), the method 300 finds the resulting subgraphs using a generic graph search algorithm, such as a connected-components or breadth-first search (block 311). At block 313, the method 300 searches among the subgraphs for the largest subgraph. Assuming a largest subgraph exists and there is agreement among all its datum nodes (blocks 315 and 317), the method 300 returns the datum nodes in the largest subgraph as the set of correct datum nodes (block 319).

In some instances, such as when too many data entities are corrupted or when the data entities are corrupted in such a way that some of the relationships between the faulty data entities remain valid, the method 300 may not be able to complete the diagnosis. In the first case, no unique largest subgraph may be found (block 315). In the second case, all the nodes that participate in one or more invalid relationships between the data entities may belong to the largest subgraph, leading to disagreement among its nodes (block 317). In both cases, the method 300 is unable to determine the correct data entities and performs appropriate error processing (block 321). Depending on implementation, the error processing at block 321 may transfer control to an alternate diagnosis mechanism, return a failure message to alert an operator of the problem, or execute other such contingency procedures.

Various algorithms may be employed to determine the largest subgraph at block 313. For example, it may the subgraph with the most datum nodes, the subgraph with the most relationship nodes, or the largest number of total nodes. Additionally, the nodes may be weighted and the subgraphs with the highest weight designated as the largest. Furthermore, if the primary criteria, e.g., datum nodes, results in a tie between subgraphs, secondary criteria, e.g., total nodes, may be used to select among the subgraphs.

Figure 4:
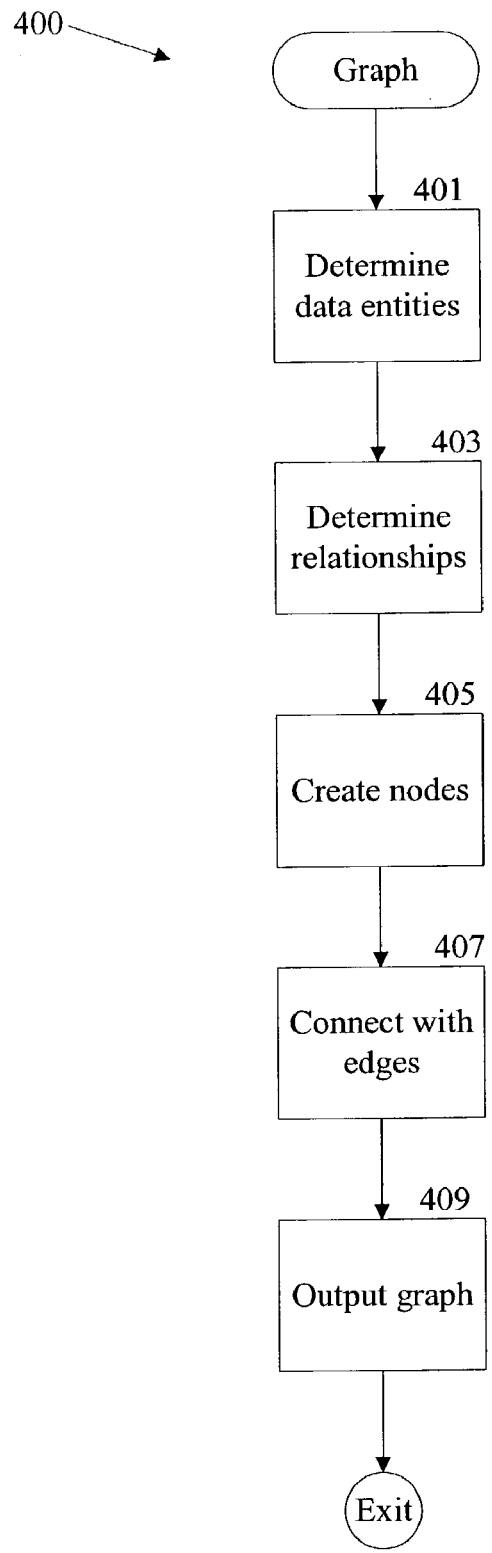
FIG. 4 is a flowchart of an method for creating the subgraphs of FIGS. 1A–C.
Figure 5A:
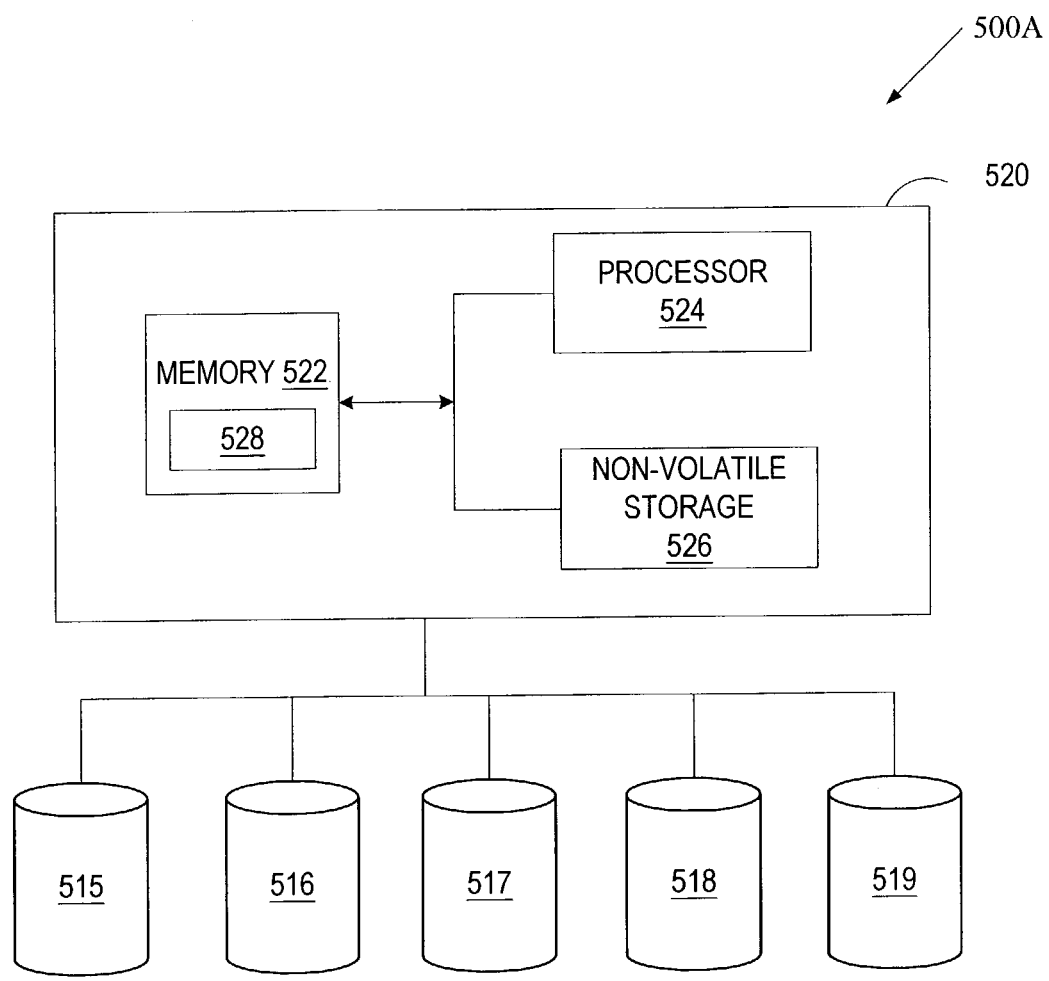
FIGS. 5A–C are diagrams of exemplary processing environments in which embodiments of the invention may incorporated.
Figure 5B:
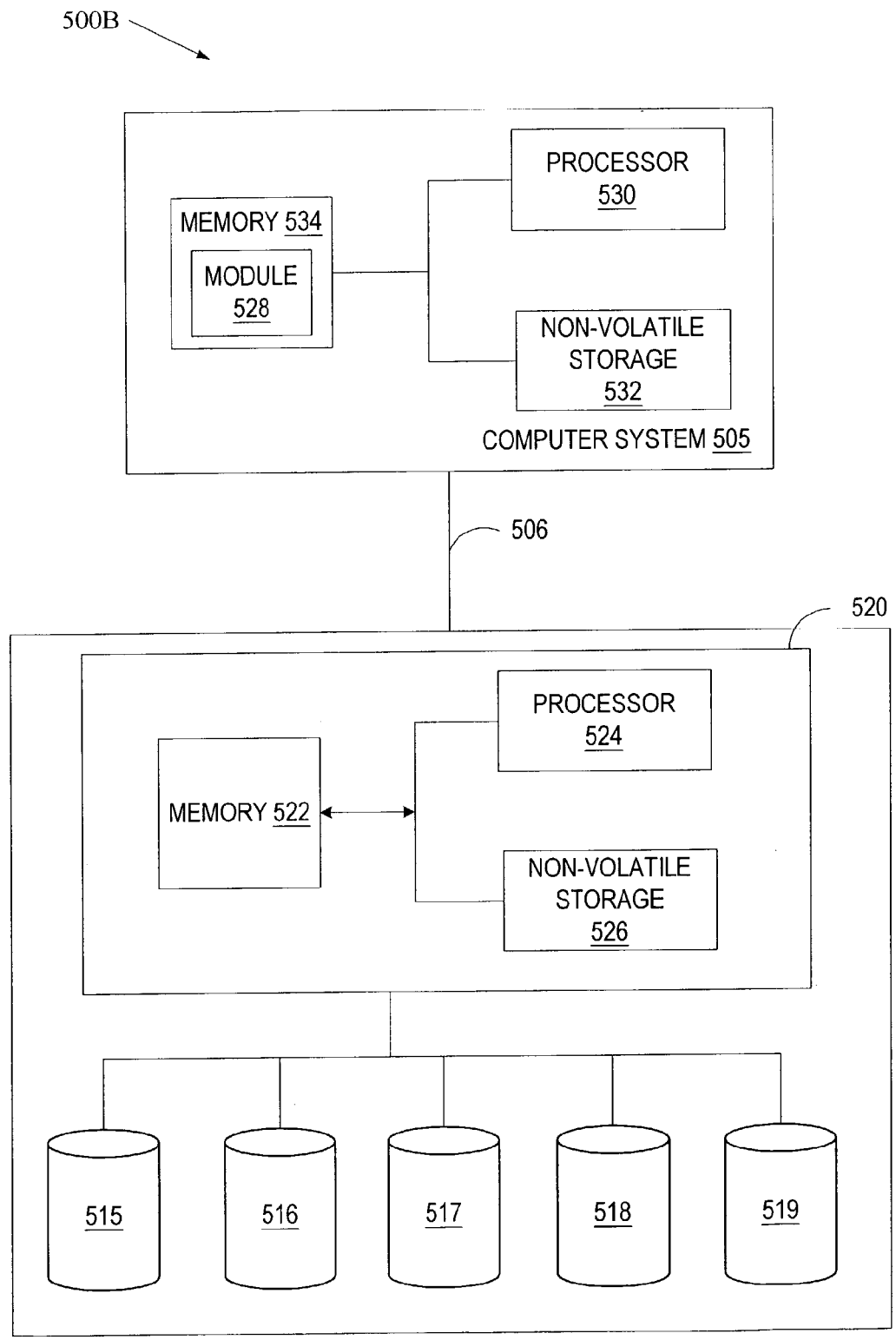
Figure 5C:
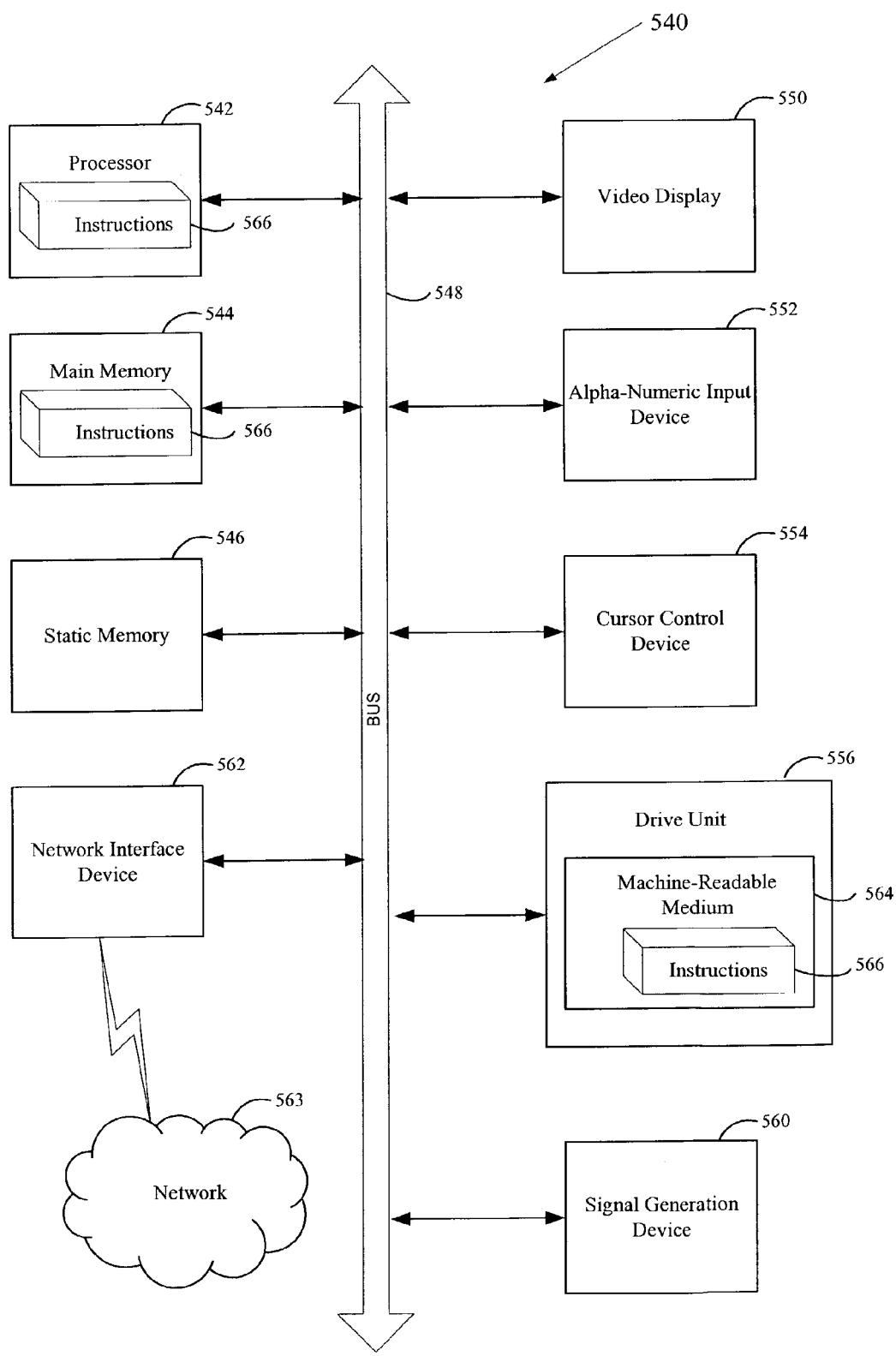

FIG. 4 illustrates a graph method that may be used to create the initial input graph used by the diagnosis method 300 of FIG. 3. The method 400 analyzes the data arrangement to determine the data entities in the arrangement and the relationship between the data entities (blocks 401 and 403). The method 400 creates nodes for each of the data entries and the relationships (block 405) and connects the datum nodes to the corresponding relationship nodes with graph edges (block 407). The resulting graph is output at block 409 for subsequent use.

FIGS. 5A and 5B illustrate exemplary embodiments of data storage systems in which the present invention may be practiced. Referring to first to FIG. 5A, a data storage system 500A contains a disk array composed of one or more sets of storage devices (redundancy groups) such as disks 515–519 that may be magnetic or optical storage media or any other fixed-block storage media, such as memory cells. Data in disks 515–519 is stored in blocks (e.g., data blocks of 512-bytes in lengths).

Data storage system 500A also contains an array controller 520 that controls the operation of the disk array. Array controller 520 provides the capability for data storage system 500A to perform tasks and execute software programs stored within the data storage system. Array controller 520 includes one or more processors 524, memory 522 and non-volatile storage 526 (e.g., non-volatile access memory (NVRAM), flash memory, etc.). Memory 522 may be random access memory (RAM) or some other machine-readable medium, for storing program code (e.g., software for performing any method of the present invention) that may be executed by processor 520. The machine-readable medium may include a mechanism that provides (i.e., stores and/or transmits) information in a form readable by a machine such as a computer or digital processing device. For example, a machine-readable medium may include a read only memory (ROM), random access memory (RAM), magnetic disk storage media, optical storage media, flash memory devices, etc. The code or instructions may be represented by carrier-wave signals, infrared signals, digital signals, and by other like signals. Non-volatile storage 526 is a durable data storage area in which data remains valid during intentional and unintentional shutdowns of data storage system 500A.

In one embodiment, controller 520 includes a data corruption diagnosis module 528 for determining the source of data corruption within the data storage system 500A as described above. Module 528 may be implemented in hardware, software, or a combination of both. In one embodiment, software module 528 is stored in memory 522. The module 528 may also create the initial graph used in the diagnosis or the graph may be created by a separate module. The graph may be cached in memory 522 or stored on non-volatile storage 526.

Module 528 may or may not reside in controller 520. Specifically, module 528 may be implemented anywhere within the block-based portion of the I/O datapath. The datapath referred to herein represents any software, hardware, or other entities that manipulate data in block form (i.e., from the time the data enters block form on write operations to the point where the data leaves block form on read operations). The datapath extends from the computer that reads or writes the data (converting it into block form) to the storage device where the data resides during storage. For example, the datapath may include software modules such as volume managers that stripe or replicate the data, the disk arrays that store the data blocks, the portion of the file system that manages data in blocks, the network that transfers the blocks, etc.

FIG. 5B illustrates an exemplary data storage system 500B, in which module 528 is implemented outside of controller 520, in a computer system 505, according to some embodiments of the present invention. Computer system 505 may be a server, a host or any other device external to controller 520 within the datapath. Users of data storage system 500B may be connected to computer system 505 directly or via a network such as a local area network or a storage array network. Controller 520 communicates with computer system 505 via a bus 506 that may be a standard bus for communicating information and signals and may implement a block-based protocol (e.g., SCSI or fiber channel). Array controller 520 is capable of responding to commands from computer system 505.

In one embodiment, computer 505 includes non-volatile storage 532 (e.g., NVRAM, flash memory, etc.) that stores the graph created for the data storage system when it is assumed that the data is correct and may also may be cached in memory 534 when diagnosing corruption in the data storage system. In one embodiment, memory 534 stores software module 528 and other program code that can be executed by processor 530. Memory 534 may be RAM or some other machine-readable medium. The machine-readable medium may include a mechanism that provides (i.e., stores and/or transmits) information in a form readable by a machine such as a computer or digital processing device. For example, a machine-readable medium may include a read only memory (ROM), random access memory (RAM), magnetic disk storage media, optical storage media, flash memory devices, etc. The code or instructions may be represented by carrier-wave signals, infrared signals, digital signals, and by other like signals.

The diagnosis of corruption in data entities other than data storage systems may be performed by a machine such as computer system 540 illustrated in FIG. 5C. In alternative embodiments, the machine may comprise a network router, a network switch, a network bridge, or any machine capable of executing a sequence of instructions that specify actions to be taken by that machine.

The computer system 540 includes a processor 542, a main memory 544, and a static memory 546, such as non-volatile storage, which communicate with each other via a bus 548. The computer system 540 may further include a video display unit 50, an alpha-numeric input device 52, a cursor control device 54, a disk drive unit 56, a signal generation device 560 and a network interface device 562.

The disk drive unit 56 includes a machine-readable medium 564 on which is stored a set of instructions or modules 566 embodying any one, or all, of the methodologies described above. The instructions 566 are also shown to reside, completely or at least partially, within the main memory 544 and/or within the processor 542. The disk drive unit 56 is typically one or more disk drives that do not participate in the redundancy relationships previously described for FIGS. 5A and 5B.

The computer system 540 interfaces to external systems through the modem or network interface 562. It will be appreciated that the modem or network interface 562 can be considered to be part of the computer system 540. This interface 562 can be an analog modem, ISDN modem, cable modem, token ring interface, satellite transmission interface (e.g. "Direct PC"), or other interfaces for coupling a computer system to other computer systems. The computer system 540 and the external systems can be connected in a local area network (LAN) configuration, in a wide-area network WAN configuration, or in a storage area network (SAN) (generically represented as network 563). The network 563 can be either public or private.

It will be appreciated that the computer system 540 is one example of many possible computer systems which have different architectures and are controlled by operating systems software, such as Solaris™ from Sun Microsystems, Inc. One of skill in the art will immediately appreciate that the invention can be practiced with other computer system configurations, including hand-held devices, multiprocessor systems, microprocessor-based or programmable consumer electronics, network PCs, minicomputers, mainframe computers, and the like. The invention can also be practiced in distributed computing environments where tasks are performed by remote processing devices that are linked through a communications network. Thus, the description of FIG. 5C is intended to provide an overview of computer hardware and other operating components suitable for performing the methods of the invention described above, but is not intended to limit the applicable environments.

Diagnosis of data corruption in related data entities has been described as using graphs with edges that connect datum nodes to relationship nodes. Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention. Therefore, it is manifestly intended that this invention be limited only by the following claims and equivalents thereof

What is claimed is:

1. A computer implemented method of diagnosing data corruption in a system of hardware components, the method comprising:
   obtaining a graph representing an arrangement of data entities, the graph comprising datum nodes representing the data entities, relationship nodes representing relationships among the data entities, and edges connecting the datum nodes through the relationship nodes, wherein each data entity is associated with a hardware component in the system;
   analyzing the relationships among the data entities in the arrangement;
   removing edges connecting datum nodes with a relationship node when the corresponding relationship is invalid; and
   designating as correct the data entities represented by the datum nodes in a subgraph that results from removing edges.

2. The method of claim 1, wherein designating comprises: searching for a largest subgraph when a plurality of subgraphs result from removing edges.

3. The method of claim 2, wherein no data entities are designated as correct when no largest subgraph is found.

4. The method of claim 2, wherein no data entities are designated as correct when the nodes in the largest subgraph disagree.

5. The method of claim 1 further comprising:
   creating the graph when the data entities are assumed correct.

6. The method of claim 1, wherein the data entities are data and metadata and the relationships associate the metadata with the data.

7. The method of claim 1, wherein the arrangement of data entities is part of a data storage system.

8. A computer implemented method comprising:
   analyzing an arrangement of data entities and relationships among the data entities, wherein each data entity is associated with a hardware component in the system;

creating a graph representing the arrangement, the graph comprising datum nodes representing the data entities, relationship nodes representing the relationship, and edges connecting the datum nodes through the relationship nodes; and storing the graph for subsequent use in diagnosing data corruption in the system.

9. The method of claim 8, wherein the arrangement is part of a data storage system.

10. A machine-readable storage medium having executable instructions to cause a machine to perform a method comprising:

evaluating relationships among data entities for validity, wherein each data entry is associated with a hardware component in a system;

modifying a graph by removing edges between nodes representing each invalid relationship and nodes representing the data entities participating in each invalid relationship; and designating the data entities represented by the nodes in a subgraph created by modifying the graph as correct data entities.

11. The machine-readable storage medium of claim 10, wherein designating the data entities further comprises: determining a largest subgraph when a plurality of subgraphs are created by modifying the graph.

12. The machine-readable storage medium of claim 11, wherein no data entities are designated as correct when the largest subgraph does not exist.

13. The machine-readable storage medium of claim 11, wherein no data entities are designated as correct when the nodes in the largest subgraph do not agree.

14. The machine-readable storage medium of claim 10, wherein the method further comprises: obtaining the graph, wherein the graph represents an arrangement for the data entities and the relationships.

15. The machine-readable storage medium of claim 10, wherein the method further comprises: creating the graph, wherein the graph represents an arrangement for the data entities and the relationships.

16. The machine-readable storage medium of claim 10, wherein the data entities comprise data and metadata associated with the data through the relationships.

17. The machine-readable storage medium of claim 10, wherein the machine controls a data storage system containing the data entities.

18. A machine-readable storage medium having executable instructions to cause a machine to perform a method comprising:

creating nodes representing data entities and relationships among the data entities, wherein each data entity is associated with a hardware component in the system;

connecting the nodes representing the relationships to the nodes representing the data entities participating in the relationships with edges to form a graph; and storing the graph for subsequent use in diagnosing data corruption in the system.

19. The machine-readable storage medium of claim 18, wherein the machine is coupled to a data storage system containing the data entities.

20. A computer-readable storage medium having a graph data structure comprising:

a set of data node fields, each containing data representing a data entity, wherein each data entity is associated with a hardware component in a system to diagnose data corruption in the system;

a set of relationship node fields, each containing data representing a relationship among the data entities represented by the set of data node fields; and a set of edge fields, each containing data representing a connection between one of the data node fields and one of the relationship node fields, wherein the one of the relationship node fields represents a relationship in which the data entity represented by the one of the data node fields participates.

21. A system comprising:

a processor coupled to a bus;

a machine-readable medium coupled to the processor through the bus, the machine readable-medium having data entities stored thereon;

a memory coupled to the processor through the bus and containing a graph comprising datum nodes representing the data entities, relationship nodes representing relationships among the data entities, and edges connecting the datum nodes through the relationship nodes; and a diagnosis process executed by the processor to cause the processor to remove an edge in the graph between a datum node and a relationship node when the relationship represented by the relationship node is invalid, and to designate a set of datum nodes that remain connected through edges as representing correct information.

22. The system of claim 21, wherein the diagnosis process further causes the processor to search for a largest set of nodes that remain connected through edges to determine the set to designate.

23. The system of claim 22, wherein the diagnosis process further causes the processor to skip designating any data node as representing correct information when the largest set is not found.

24. The system of claim 22, wherein the diagnosis process further causes the processor to skip designating any data node as representing correct information when the nodes in the largest set do not agree.

25. The system of claim 22, wherein the data entities comprise data and metadata associated with the data.

26. The system of claim 22 further comprising:

a graphing process executed by the processor to cause the processor to create the graph.

27. The system of claim 22, wherein the machine-readable medium is a data storage array.

28. The system of claim 22, wherein the machine-readable medium is coupled to the bus through a network interface.

29. A system comprising:

a processor coupled to a bus;

a memory coupled to the processor through the bus;

a machine-readable medium coupled to the processor through the bus, the machine readable-medium having data entities stored thereon, wherein each data entity is associated with a hardware component; and a graph process executed by the processor to cause the processor to create datum nodes representing the data entities, relationship nodes representing relationships among the data entities, and edges connecting the datum nodes through the relationship nodes to form a graph for use in diagnosing data corruption in the data entities.

30. The system of claim 29, wherein the processor executes the graph process when the data entities are assumed to be correct.

31. The system of claim 29, wherein the graph process further causes the processor to store the graph on one of the memory or the machine-readable medium.

32. An apparatus comprising:
   means for evaluating relationships among data entities for validity, wherein each data entity is associated with a hardware component in a system to diagnose data corruption in the system; and
   means for modifying a graph, wherein the means for modifying removes edges in a graph between a node representing an invalid relationship and nodes representing the data entities participating in the invalid relationship, wherein the data entities represented by the nodes in a subgraph resulting from the modification are assumed correct.

33. The apparatus of claim 32, wherein the means for modifying further comprises:
   means for searching for a largest subgraph when a plurality of subgraphs result.

34. The apparatus of claim 33, wherein the datum nodes in a largest subgraph represent the correct data entities.

35. The apparatus of claim 33, wherein the means for modifying further does not assume any data entities are correct when the largest subgraph does not exist.

36. The apparatus of claim 33, wherein the means for modifying further does not assume any data entities are correct when nodes in the largest subgraph do not agree.

37. The apparatus of claim 32, further comprising:
   means for obtaining the graph.

38. The apparatus of claim 32, further comprising;
   means for creating the graph.

39. An apparatus comprising:
   means for creating a graph, wherein the means for creating the graph creates nodes representing data entities and relationships among the data entities, and connects the nodes representing the relationships to the nodes representing the data entities participating in the relationships with edges, wherein each data entity is associated with a hardware component; and
   means for storing the graph for subsequent use in diagnosing corruption in the system.

* * * * *